(12) United States Patent
Gunzelmann et al.

(10) Patent No.: US 11,848,703 B2
(45) Date of Patent: Dec. 19, 2023

(54) COMMUNICATION DEVICES AND METHODS FOR DIRECT DETECTION AND PHOTONICS RECEIVER

(71) Applicant: Apple Inc., Cupertino, CA (US)

(72) Inventors: Bertram R. Gunzelmann, Koenigsbrunn (DE); Zdravko Boos, Munich (DE)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/895,057

(22) Filed: Aug. 24, 2022

(65) Prior Publication Data

US 2023/0090151 A1 Mar. 23, 2023

Related U.S. Application Data

(60) Provisional application No. 63/246,771, filed on Sep. 21, 2021.

(51) Int. Cl.
*H04B 10/2575* (2013.01)
(52) U.S. Cl.
CPC .............................. *H04B 10/25752* (2013.01)
(58) Field of Classification Search
CPC ............................................... H04B 10/25752
USPC ............................................................ 398/115
See application file for complete search history.

(56) References Cited

U.S. PATENT DOCUMENTS

| | | | |
|---|---|---|---|
| 7,103,279 B1* | 9/2006 | Koh | H04B 10/112 398/115 |
| 7,112,968 B1* | 9/2006 | Nishizawa | G01R 31/1272 324/536 |
| 8,208,585 B2* | 6/2012 | Qi | H04L 25/067 375/330 |
| 9,859,678 B2 | 1/2018 | Middleton et al. | |
| 10,014,952 B2* | 7/2018 | Jensen | H04B 10/616 |
| 2017/0026125 A1* | 1/2017 | Middleton | H04B 10/25758 |
| 2021/0306075 A1* | 9/2021 | Morton | G02B 27/00 |
| 2022/0109505 A1* | 4/2022 | Ito | H04B 10/548 |
| 2023/0090151 A1* | 3/2023 | Gunzelmann | H04B 10/25758 398/115 |
| 2023/0093054 A1* | 3/2023 | Gunzelmann | H01Q 3/2676 343/702 |

FOREIGN PATENT DOCUMENTS

| | | | | |
|---|---|---|---|---|
| CN | 101141202 B | * | 1/2012 | |
| CN | 213816430 U | * | 7/2021 | |
| EP | 3964811 A1 | * | 3/2022 | H01Q 23/00 |
| WO | 2020153222 A1 | | 7/2020 | |

OTHER PUBLICATIONS

Zhou et al; Intelligent Matching of the Control Voltage of Delay Line Interferometers for Differential Phase Shift Keying-Modulated Optical Signals; Oct. 2021;MDPI; pp. 1-17. (Year: 2021).*

(Continued)

*Primary Examiner* — Amritbir K Sandhu
(74) *Attorney, Agent, or Firm* — Kilpatrick Townsend & Stockton LLP

(57) ABSTRACT

The present application relates to devices and components related to a direct detection and photonics receiver.

20 Claims, 12 Drawing Sheets

(56) References Cited

OTHER PUBLICATIONS

Lu et al., Photonic Assisted Beam Steering for Millimeter-Wave and THz Antennas, IEEE, 2018, 4 pages.
Yoon et al., Performance comparison of optical 8-ary differential phase-shift keying systems with different electrical decision schemes, Optics Express, vol. 13, No. 2, Jan. 24, 2005, 6 pages.
European Patent Application No. 22192110.9, Extended European Search Report, dated Feb. 10, 2023, 10 pages.

* cited by examiner

COMMUNICATION DEVICES AND METHODS FOR DIRECT DETECTION AND PHOTONICS RECEIVER

CROSS-REFERENCE TO RELATED APPLICATION

This application claims the benefit of U.S. Provisional Patent Application No. 63/246,771, filed on Sep. 21, 2021, which is herein incorporated by reference in its entirety for all purposes.

BACKGROUND

New use cases are developing that will test the signaling and processing capacities of wireless networks and devices. Augmented reality (AR) and extended reality (XR) are two use cases that will benefit from rapid transmission of large amounts of data over a wireless link and reduced power consumption by user devices. AR and XR applications mix real and virtual images for presentation to a user. These applications may be used in a variety of work and life sectors including industrial, logistics, retail, office administration, education, and health services.

DETAILED DESCRIPTION

Figure 1:
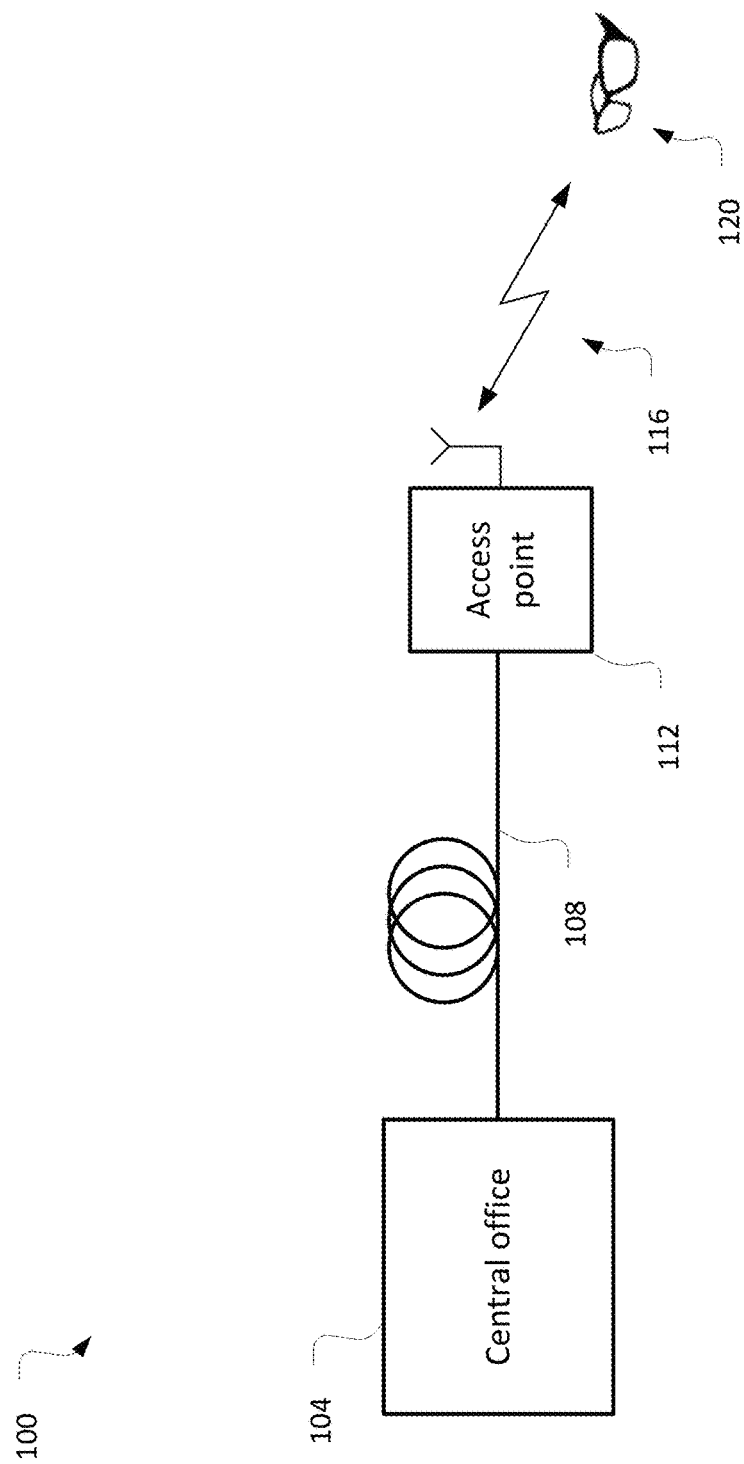
FIG. 1 illustrates an example system in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, and techniques in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A/B" and "A or B" mean (A), (B), or (A and B).

The following is a glossary of terms that may be used in this disclosure.

The term "circuitry" as used herein refers to, is part of, or includes hardware components that are configured to provide the described functionality. The hardware components may include an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), or a digital signal processor (DSP). In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, and network interface cards.

The term "user equipment" or "UE" as used herein refers to a device with radio communication capabilities that may allow a user to access network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, or reconfigurable mobile device. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, or workload units. A "hardware resource" may refer to compute, storage, or network resources provided by physical hardware elements. A "virtualized resource" may refer to compute, storage, or network resources provided by virtualization infrastructure to an application, device, or system. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radiofrequency carrier," or any other like term denoting a pathway or medium through which data is communicated. Additionally, the term "link" as used herein refers to a connection between two devices for the purpose of transmitting and receiving information.

The term "connected" may mean that two or more elements, at a common communication protocol layer, have an established signaling relationship with one another over a communication channel, link, interface, or reference point.

FIG. 1 illustrates an example system 100 in accordance with some embodiments. In particular, the system 100 may include a central office 104 that is communicatively coupled with an access point 112 via a fiber-optical connection 108. The fiber-optical connection 108 may include, for example, plastic optical fiber, multimode graded index fiber, or singlemode fiber.

The access point 112 may be communicatively coupled with the UE 120 via a wireless connection 116. The system 100 is a simplified version illustrating a single representation of each element for clarity and brevity. It should be understood that one or more of each of the elements may be present in embodiments of the network arrangement 100.

In some embodiments, the UE 120 may be a wearable UE such as smart glasses that may be capable of providing an AR/XR experience for a user. In other embodiments, the UE 120 may be another type of UE.

The compute/memory intensive tasks of the system 100 may largely be performed in the central office 104, which may be provided with sufficiently high compute capabilities to facilitate the desired offloading of the communication and application tasks that are typically performed in the access point 112 or the UE 120. Concentrating the compute/memory intensive tasks within the central office 104 may reduce complexity and power consumption in the access point 112 and the UE 120, which may also reduce delay that may occur in the entire link between the central office 104 and the UE 120.

The wireless connection 116 may provide a broadband radio communication link, which may be in a terahertz (THz) frequency range and have a high bandwidth. As used herein, a THz frequency range may include frequencies above 100 GHz. The optical front-haul link, via the fiber optical connection 108, may have a bandwidth that is higher than the bandwidth of the wireless connection 116 by a factor. The central office 104 may provide an analog waveform on the fiber-optical connection 108 that the access point 112 may easily translate to the radio-frequency (RF) waveform to be transmitted on the wireless connection 116.

The central office 104 may include AP control circuitry to provide the access point 112 with control signals for the wireless connection 116. The central office 104 may also include UE control circuitry to provide the UE 120 with control signals for the wireless connection 116 and data signals for user output.

In some embodiments, the central office 104 may control the sensing that occurs with respect to the communication channel 116 to calculate various communication parameters. The sensing may be used to determine a link quality (for example, channel state information) and perform beam management for directed transmissions/receptions by the access point 112 and the UE 120. In some examples, the central office 104 may periodically control the access point 112 to perform a beam sweeping operation by sending reference signals on a plurality of beams. The UE 120 may measure the plurality of beams and transmit the measurements to the central office 104. In some embodiments, the measurement data may be transmitted to the central office 104 in a raw form to avoid the UE 120 having to process the measurements. The central office 104 may then use the measurement data to determine the desired beams to use at both the access point 112 and the UE 120.

In some embodiments, the central office 104 may control the sensing of the communication channel 116 by providing the optical signal with a radar component. Feedback from the radar reflections sensed at the access point 112 may be provided to the central office 104 to enable the central office 104 to determine a location of objects around the access point 112.

Upon obtaining the feedback from the access point 112 and UE 120, the central office 104 may generate the communication parameters, which may then be transmitted to the access point 112 and UE 120 to control aspects of communication over the wireless connection 116. The communication parameters may relate to transmit/receive beams, uplink/downlink transmit power, modulation and coding schemes, joint bandwidth, polarization, forward error correction (FEC), or carrier/local oscillator (LO) frequencies.

In one example, the AP control circuitry may calculate beamforming weights or precoding matrices that are transmitted to the access point 112. The access point 112 may utilize the beamforming weights/precoding matrices to form transmit/receive beams to facilitate communications over the wireless connection 116. Similarly, the UE control circuitry may transmit beamforming weights/precoding matrices to the UE 120, which the UE 120 may utilize to form transmit/receive beams at the UE 120. Beamforming may be especially useful in the system 100 given the relatively high level of attenuation wireless signals may experience in the terahertz frequency range.

Both the access point 112 and the UE 120 may include antenna arrays that may be used to form the transmit/receive beams. The antennas of the arrays may include microstrip antennas, printed antennas fabricated on the surface of one or more printed circuit boards, patch antennas, or phased array antennas. The antennas may be small given the high-frequencies of the signals transmitted over the wireless connection 116. This may provide flexibility in designing the UE 120 to accommodate an antenna array with a small footprint.

While some embodiments describe the UE 120 as smart glasses to enable XR/AR experiences, the system 100 may be additionally/alternatively utilized to facilitate other end-user applications with other UEs.

The system 100 may utilize time division duplexing (TDD). In some embodiments, the downlink communications may rely on a quadrature amplitude modulation (QAM) and have a high data rate of more than 50 gigabits per second, while the uplink communications may rely on a simpler modulation scheme such as amplitude shift keying (ASK) and may have a relatively lower data rate of around 1 MB per second. Given the quality of the link, little-to-no forward error correction may be needed in the communications of the system 100.

In the downlink, coherent modulation and demodulation of a QAM signal constellation may be transmitted via the joint fiber communication and radio channel of the system 100. This, together with the antenna beam-forming that may be performed by the UE 120, may be associated with high synchronization requirements. Embodiments of the present disclosure describe how to exploit the optical receiver antenna array steering that may precede direct detection/demodulation to efficiently generate an output bit stream. The differential modulation described in various embodiments may reduce the architecture complexity and avoid sophisticated digital signal processing. For example, the use of complex analog-to-digital converters may be reduced or even eliminated in the datapath. While the above embodiments describe downlink communications based on QAM, other modulations may be used as will be described herein.

As described above, the fiber and radio resources of the system 100 may be tightly coupled. This may provide constraints that have not yet been addressed given that previous communication systems have the ability to optimize the fiber front haul and the radio channel independently. Coupling the fiber and radio parameters (for example, bandwidth, modulation order, polarization, and symbol rate) as much as possible may enable the access point 112 to have limited complexity. The limited-complexity access point 112, which may also be referred to as a lean access point 112, may only need to perform a small amount of processing of the optical fiber signal towards the terahertz radio signal. In the simplest case, an optical polarization plane may be frequency shifted to a terahertz linearly polarized radio signal. This may avoid any demodulation and re-modulation within the access point 112. As a consequence, the optical fiber channel and radio transmission channel could be viewed as a combined overall channel. Thus, embodiments describe a modulation scheme suitable for both domains that can also be implemented efficiently in the UE 120.

Figure 2:
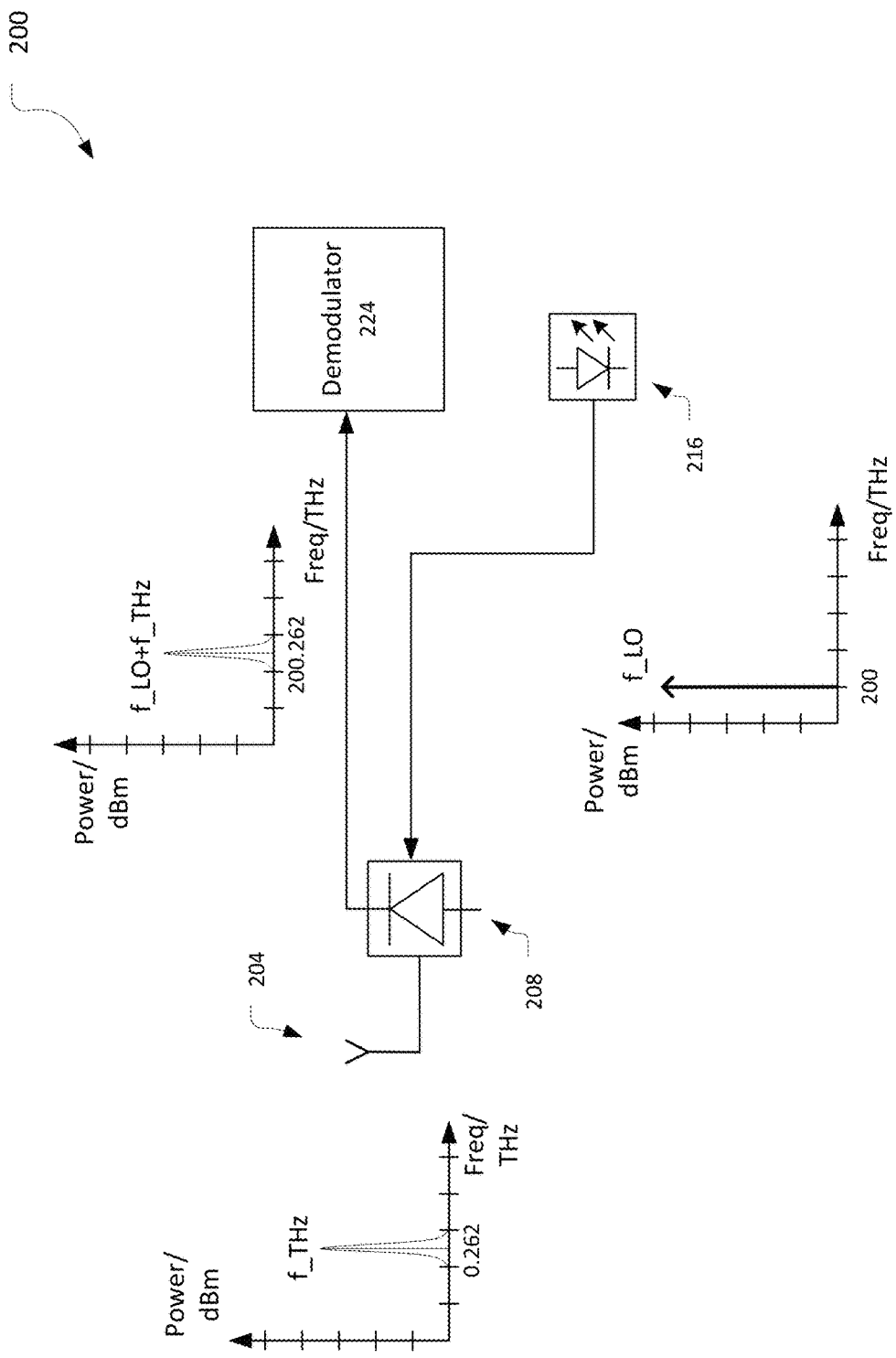
FIG. 2 illustrates a receiver in accordance with some embodiments.

FIG. 2 illustrates a receiver 200 in accordance with some embodiments. The receiver 200, which may be within the UE 120, may have an antenna 204 to receive an OTA signal, which may have a frequency (f_THz) of 262 GHz in some embodiments. The antenna 204 may be, for example, a bow-tie antenna. The antenna 204 may be coupled with a photodetector 208. The photodetector 208 may be a uni-traveling-carrier (UTC) photodiode in some embodiments.

The photodetector 208 may be driven by an optical local oscillator (LO) carrier provided by a laser 216. The laser 216, which may be a vertical cavity surface emitting laser (VCSEL), may provide the LO signal with a high output power that enables both mixing and amplification via the photodetector 208 for the up-converted data path. The frequency of the LO signal (f_LO) may be 200 THz.

The photodetector 208 may generate an optical signal based on the electrical signal received from the antenna 204 and the LO signal received from the laser 216. The photodetector 208 may provide the generated signal to a demodulator 224. The receiver 200 is shown with a single polarization plane; however, other embodiments may include more than one polarization plane.

The receiver 200 may process received signals based on differential modulation and direct detection techniques. These techniques may play an important role as they rely on less building blocks and typically work in an analog domain, thereby avoiding radio and mixed-signal building blocks. Various embodiments may choose a modulation type that may be efficiently applied to fiber, converted to radio, and detected by the UE 104. The demodulation operations may be doubled per polarization plane.

The receiver 200 may employ optical demodulation that reduces the electrical processing steps that must be implemented by the demodulator 224. In particular, the optical demodulation may reduce or avoid costly ADCs for the in-phase and quadrature paths. The receiver 200 may be very flexible as it may cover a wide input frequency range and signal bandwidth by avoiding frequency selective components in the main signal path and the LO path. Furthermore, providing the mixing in the optical domain allows the receiver 200 to avoid electrical amplification through low-noise amplifiers (LNAs), which is especially costly in the THz (or sub-THz) domain, prior to the direct detection.

Figure 3:
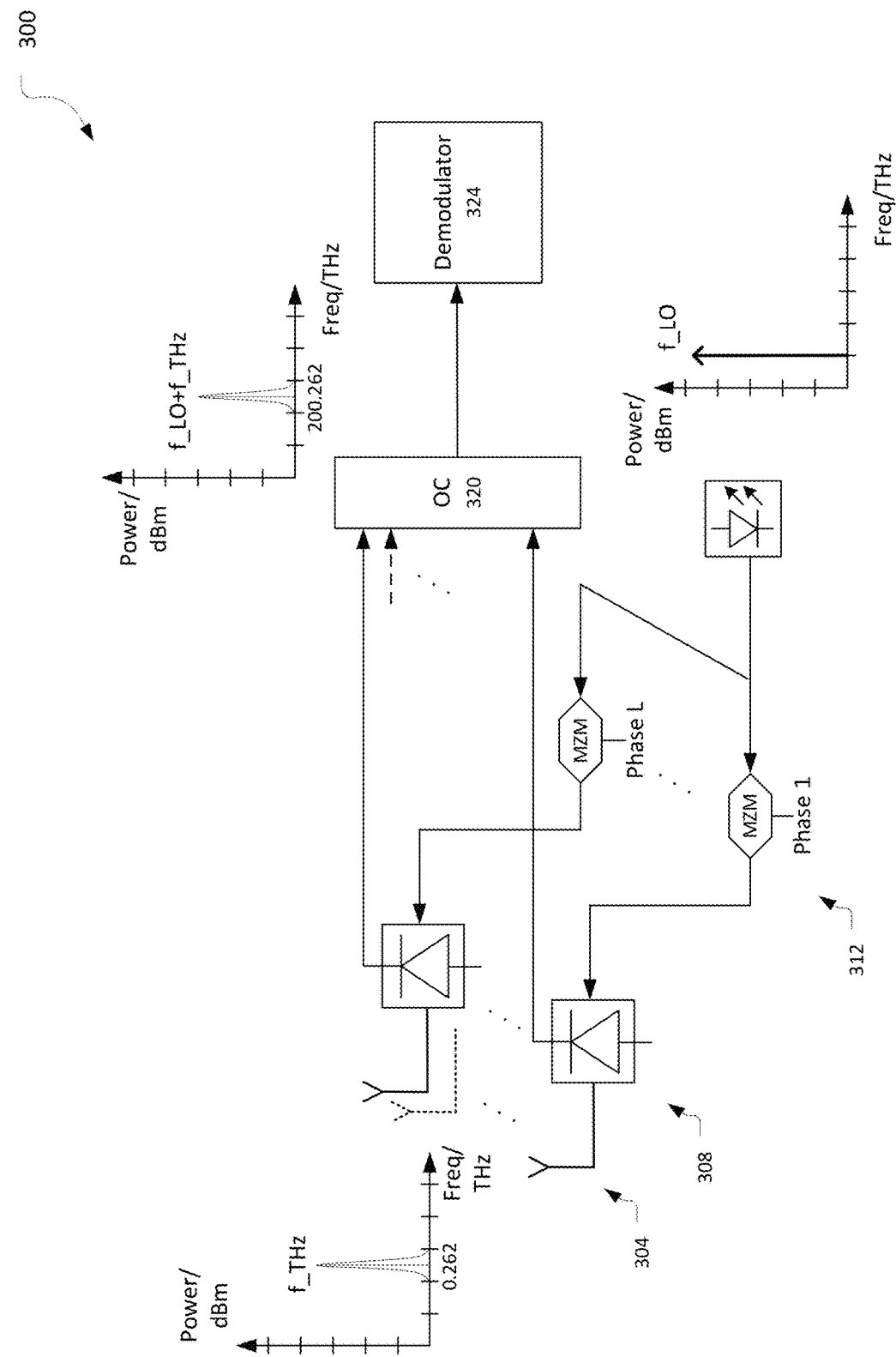
FIG. 3 illustrates another receiver in accordance with some embodiments.

FIG. 3 illustrates a receiver 300 in accordance with some embodiments. The receiver 300 may be similar to, and substantially interchangeable with, receiver 200. Except as otherwise described, the components of receiver 300 may be similar to like-named components of receiver 200.

The receiver 300 may have an array of antennas 304 to receive the OTA signal. The antennas 304 may provide an antenna-array receive gain sufficient to achieve an appropriate link budget desired by the receiver 300. The antennas 304 may be respectively coupled with photodetectors 308.

The photodetectors 308 may all be driven by an optical LO carrier with individual phase shifts (phase l). In the optical domain, Mach-Zender modulators (MZMs) 312 (or delay line interferometers (DLIs)) may apply the individual phase shifts per antenna/photodetector pair.

The receiver 300 may also include an optical combiner (OC) 320 to combine the signals from the photodetectors 308 to yield the array gain. The optical combiner 320 may provide the combined signals to a demodulator 324. The receiver 300 is shown with a single polarization plane; however, other embodiments may include more than one polarization plane.

The antenna beamforming provided by the receiver 300 may apply the phase shifts only to one path (for example, the LO path) of the mixing process. The resulting photo currents from each of the photodetector 308 may be provided by:

$$i_l(t) \propto x_{BB}(t) \cdot \sin[2\pi(f_{THz}-f_{LO})t - \varphi_l],$$

where the phase shifts ($\varphi_l$) applied in the optical LO domain, translate directly into the output domain before the optical combiner 320 and may not depend on the terahertz frequency. This approach can be applied in an upconversion transmitter as well as the receiver 300. Further, in addition to applying phase shifts, true time delays could also be applied with a different setup. This may provide the advantage of being independent of the frequency. Alternatively to an upconversion, the LO generation signal could be chosen to be lower than the terahertz frequency $f_{THz}$, which would effectively perform a downconversion to a low intermediate frequency, e.g. 20 GHz (not depicted here).

Similar to that discussed above, providing the mixing in the optical domain allows the receiver 300 to avoid electrical amplification through LNAs prior to the direct detection. And, in this embodiment, the received signals from all the beam's branches may be added coherently before detection without excessive power consumption.

Figure 4:
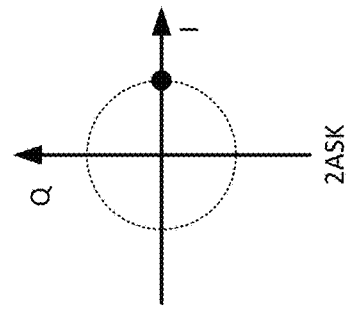
FIG. 4 illustrates different modulations in accordance with some embodiments.
Figure 4:
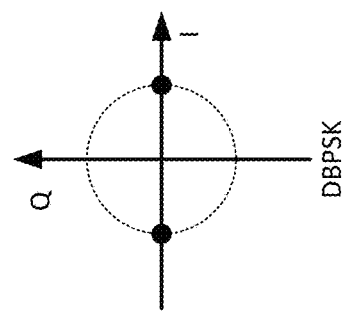
Figure 4:
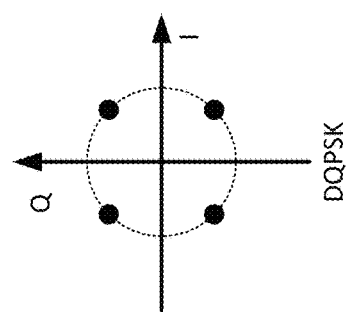
Figure 4:
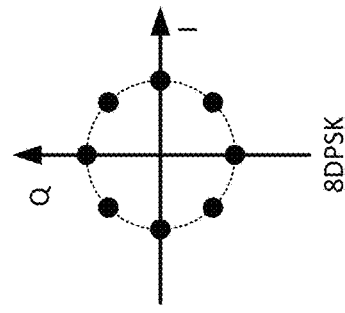
Figure 4:
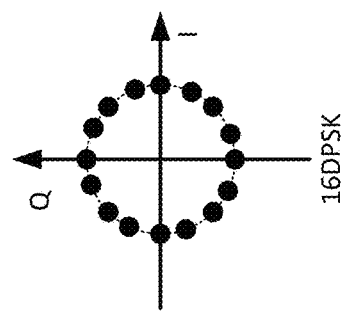
Figure 4:
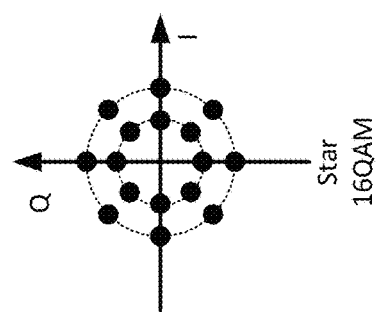

FIG. 4 illustrates differential modulations 400 that may be used in accordance with some embodiments.

The differential modulations 400 may be optical modulation schemes with high spectral efficiency. The differential modulations 400 may be single level or multilevel modulation schemes. The differential modulations 400 may include differential binary phase shift keying (DBPSK), differential quadrature phase shift keying (DQPSK), eight differential phase shift keying (8DPSK), 16 differential phase shift keying (16DPSK), or Star 16 quadrature amplitude modulation (16QAM).

When combining intensity and phase modulation, the symbols in the constellation diagrams may be arranged in different circles (for example, Star QAM) or can be positioned in a square (for example, a Square QAM).

Figure 5:
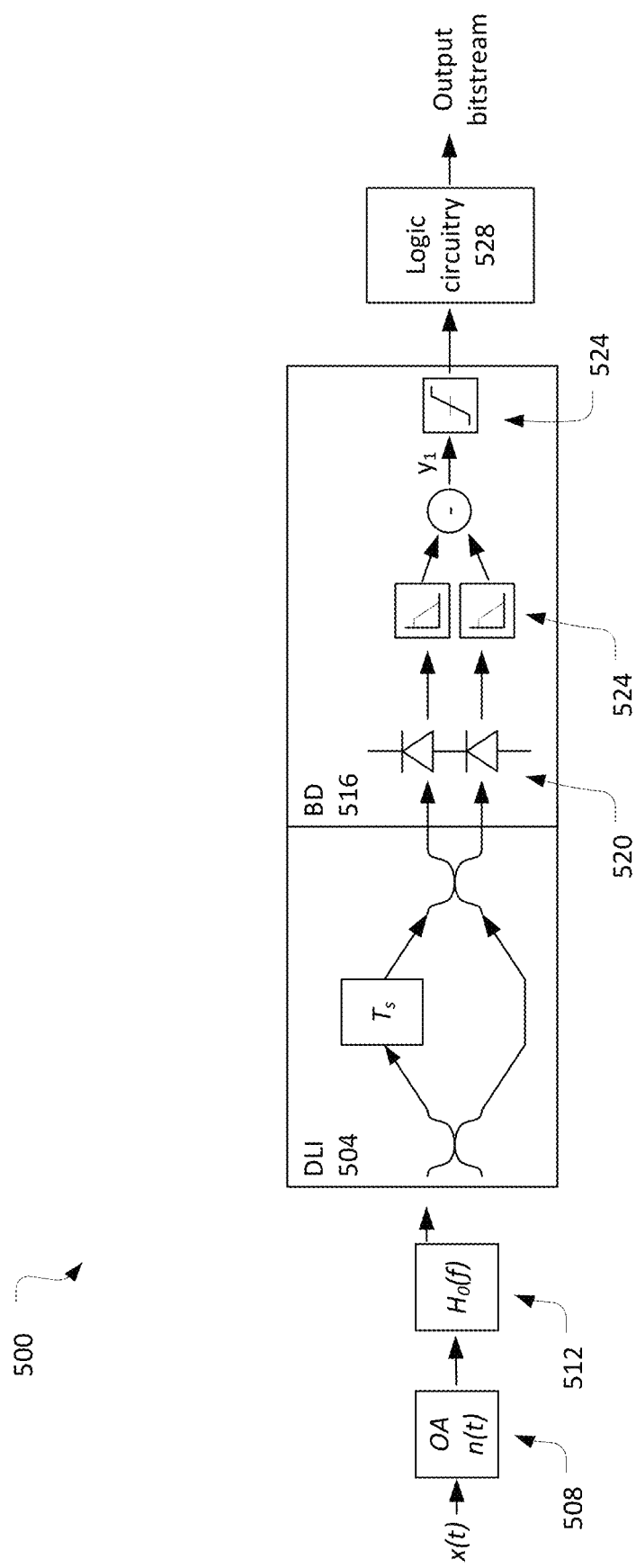
FIG. 5 illustrates a demodulator in accordance with some embodiments.

FIG. 5 illustrates a DBPSK demodulator 500 in accordance with some embodiments. The demodulator 500 may be similar to, and substantially interchangeable with, demodulator 224.

The demodulator 500 may include a delay-line interferometer (DLI) 504 that receives a signal x(t) that has been upconverted and pre-amplified by an optical preamplifier (OA) 508 and filtered by an optical bandpass filter 512. In addition to amplification, the OA 508 may also add noise to the signal. The OA 508 and the optical bandpass filter 512 may be components of a receiver separate from the demodulator 500.

The DLI 504 may include two branches, with an upper branch providing a delay ($T_s$) of one symbol duration as compared to the lower branch. The branches of the DLI 504 may provide a differential, phase-modulated optical signal. The DLI 504 may generate, based on the differential phase modulated optical signals, a pair of intensity-modulated optical signals that is provided to a balanced detector (BD) 516.

The balanced detector 516 may provide a detection operation based on a photodiode square law. The balanced detector 516 may include a pair of photodiodes 520 to generate a respective pair of electrical signals based on the pair of intensity-modulated optical signals provided by the DLI 504. The electrical signals may be filtered by lowpass filters 524. After subtraction of the two signals, the balanced detector 416 may include a bi-level detector 528 that operates on a difference, denoted as $y_1$, between the filtered electrical signals and performs a thresholding operation and, therefore, provides a positive or negative value to logic circuitry 548.

Figure 6:
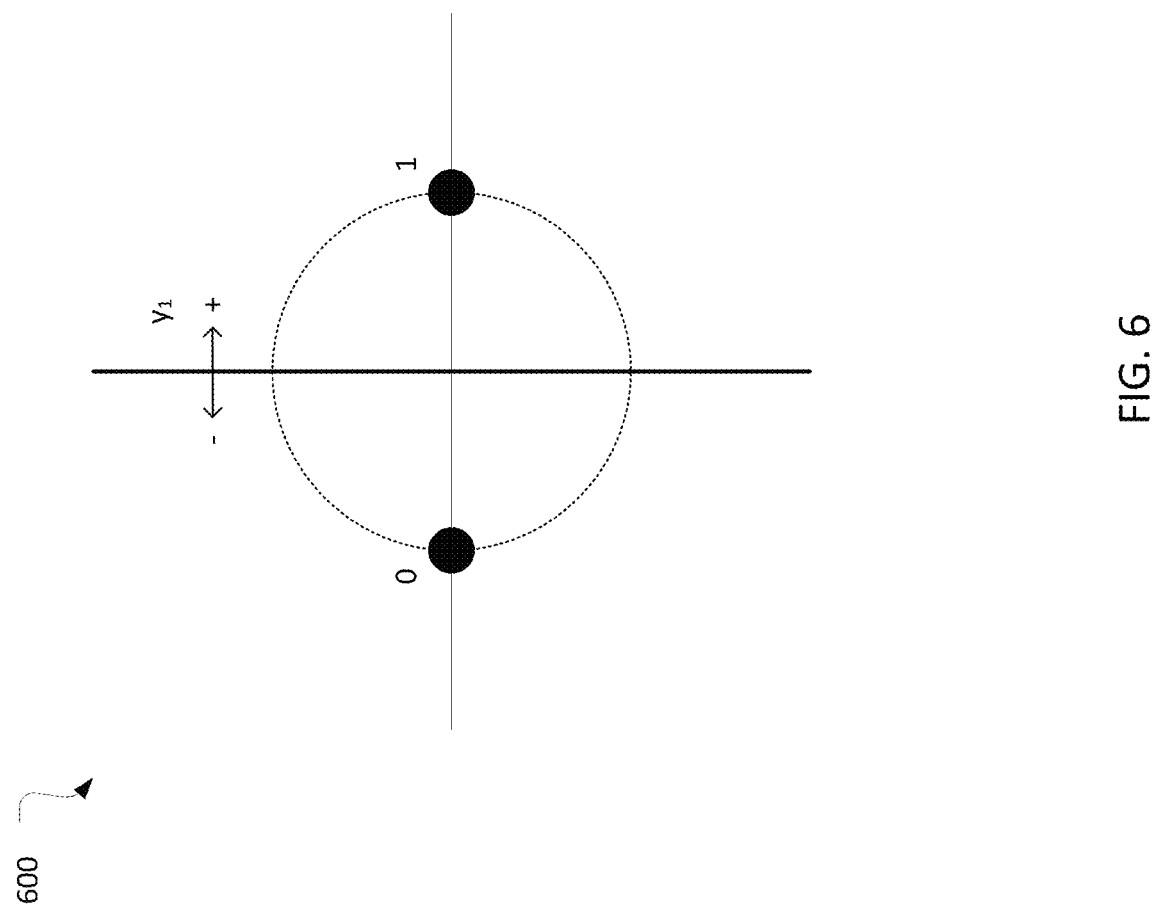
FIG. 6 illustrates a constellation graph in accordance with some embodiments.

The detector 528 may output a negative value (−) for $y_1$ if the first optical signal is less than the second optical signal or a positive value (+) for $y_1$ if the first optical signal is greater than the second optical signal. The logic circuitry 548 may then determine a bit value corresponding to $y_1$ based on constellation graph 600 shown in FIG. 6. For example, the logic circuitry 548 may determine that a negative $y_1$ value corresponds to a constellation point associated with a bit value of 0; and a positive $y_1$ value corresponds to a constellation point associated with a bit value of 1.

In one receiver option, $N_{ph}/2$ DLIs with appropriate phase shifts for phase detection may be used, where $N_{ph}$ represents the number of phase states ($N_{ph}$=M for M DPSK). In some embodiments, for detection of Star QAM signals, a further branch for intensity detection may be provided for a separate evaluation of the intensity (see, e.g. Star 16QAM of FIG. 4).

Figure 7:
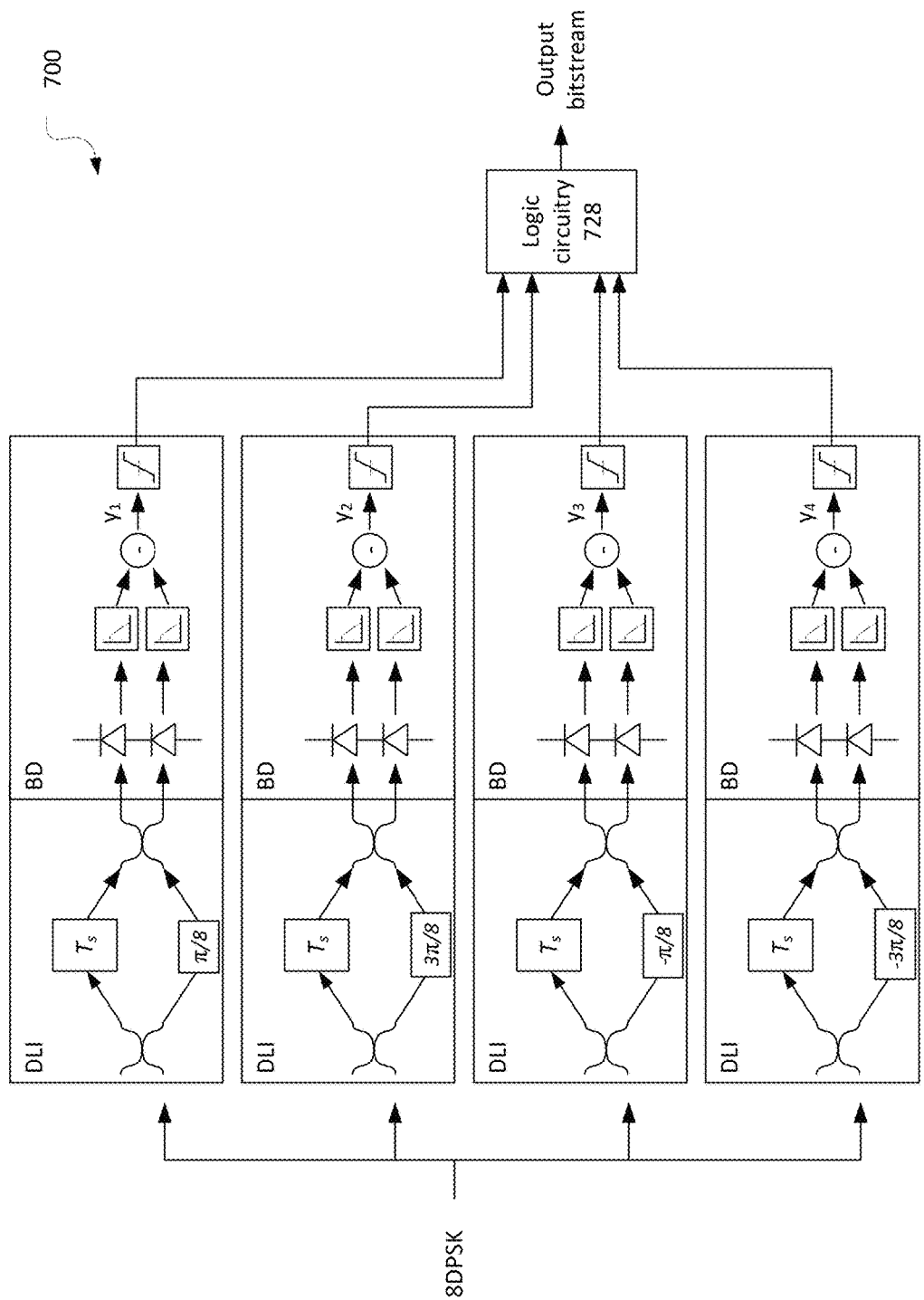
FIG. 7 illustrates another demodulator in accordance with some embodiments.

An M-ary optical DPSK signaling format may have M=$N_{ph}$ phase codes that are provided by Nph/2 DLIs and phase thresholds. FIG. 7 illustrates a direct-form implementation of a receiver 700 having a demodulator for an optical 8DPSK system in accordance with some embodiments. In this embodiment, the receiver 700 may include four DLIs/BDs in parallel. Each DLI/BD may be a one-bit delayed Mach-Zehnder (MZ) interferometer with a phase shift of $\pi/8$, $3\pi/8$, $-\pi/8$, or $-3\pi/8$ between two arms of the interferometer. The DLIs/BDs of receiver 700 may be similar to the DLI/BD of FIG. 5.

While the receiver 700 may be a simple extension of an optical DQPSK receiver, the output electrical signals from the balanced detectors may now have four specific levels. Each decision variable may be treated as a bilevel signal that may be processed with a single threshold in its respective clock-and-data recovery (CDR) module. This may be at least partly enabled due to the required phase thresholds being realized in optics of the receiver as shown in FIG. 3.

Figure 8:
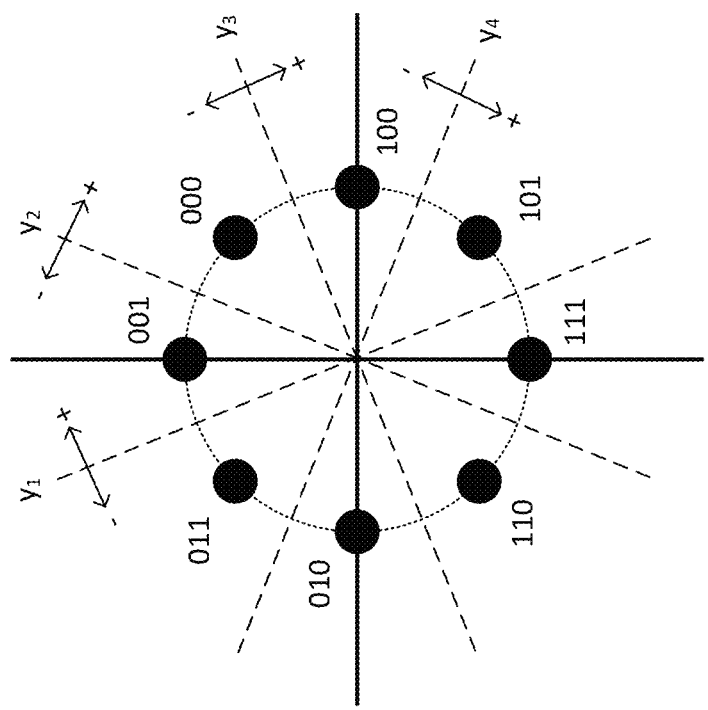
FIG. 8 illustrates another constellation graph in accordance with some embodiments.

The four BDs may output positive or negative values respectively corresponding to $y_1$-$y_4$. The logic circuitry 728 may recover the data by using a decoding table, such as gray encoding. The logic circuitry 728 may determine a bitstream corresponding to $y_1$-$y_4$ based on constellation graph 800 shown in FIG. 8. For example, the logic circuitry 748 may determine that: ($y_1$, $y_2$, $y_3$, $y_4$) values of (+, +, −, −), respectively, corresponds to a constellation point associated with a bit stream of 000; ($y_1$, $y_2$, $y_3$, $y_4$) values of (+, −, −, −), respectively, correspond to a constellation point associated with a bit stream of 001; ($y_1$, $y_2$, $y_3$, $y_4$) values of (−, −, −, −), respectively, correspond to a constellation point associated with a bit stream of 011; ($y_1$, $y_2$, $y_3$, $y_4$) values of (−, −, −, +), respectively, correspond to a constellation point associated with a bit stream of 010; ($y_1$, $y_2$, $y_3$, $y_4$) values of (−, −, +, +), respectively, correspond to a constellation point associated with a bit stream of 110; ($y_1$, $y_2$, $y_3$, $y_4$) values of (−, +, +, +), respectively, correspond to a constellation point associated with a bit stream of 111; ($y_1$, $y_2$, $y_3$, $y_4$) values of (+, +, +, +), respectively, correspond to a constellation point associated with a bit stream of 101; ($y_1$, $y_2$, $y_3$, $y_4$) values of (+, +, +, −), respectively, correspond to a constellation point associated with a bit stream of 100.

Figure 9:
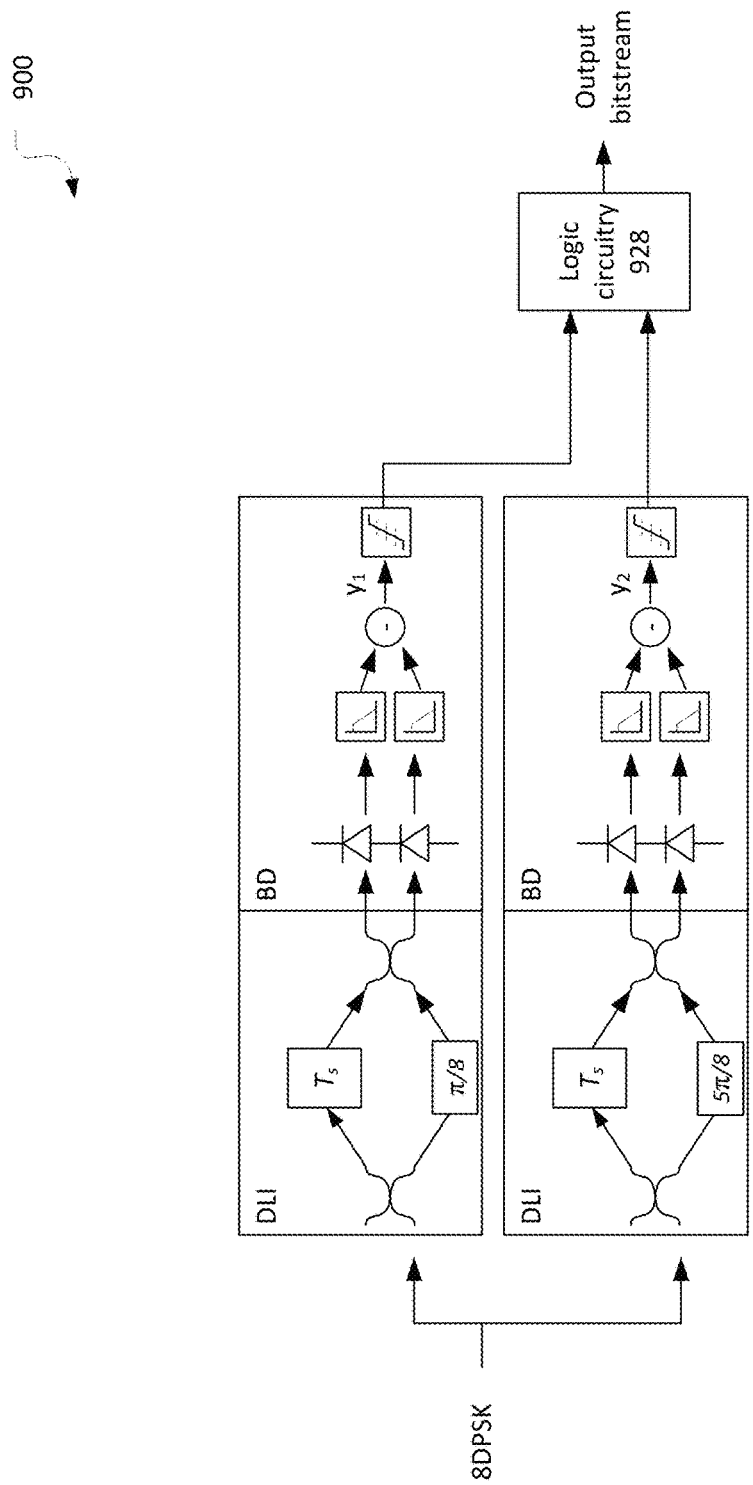
FIG. 9 illustrates another demodulator in accordance with some embodiments.

FIG. 9 illustrates a direct-form implementation of a receiver having a demodulator 900 for an 8DPSK system in accordance with other embodiments. The demodulator 800 may reduce the number of DLIs/BDs by relying on a multi-level electrical decision technique for the 8DPSK system. In this structure, the missing phase information from an insufficient number of DLIs/BDs may be fulfilled in the electrical domain by increasing the number of decision thresholds used by the detectors of the BDs.

For example, the detectors may be multi-level detectors that may output single or multi-level or negative values corresponding to difference signals $y_1$ and $y_2$. For example, for $y_1$, the detector may output a double negative value (--) if the first optical signal is less than the second optical signal by more than a first threshold, a single negative value (-) if the first optical signal is less than the second optical signal by less than the first threshold, a single positive value (+) if the first optical signal is greater than the second optical signal by less than a second threshold (which may correspond to the first threshold), and a double positive value (++) if the first optical signal is greater than the second optical signal by more than the second threshold.

Figure 10:
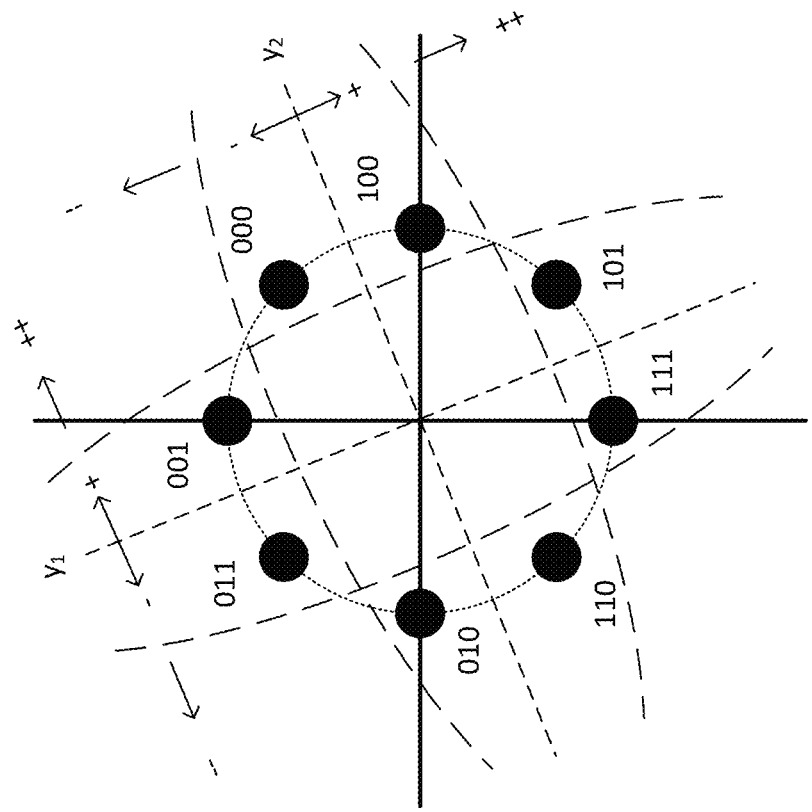
FIG. 10 illustrates another constellation graph in accordance with some embodiments.

The logic circuitry 928 may determine a bitstream corresponding to $y_1$-$y_2$ based on constellation graph 1000 as shown in FIG. 10. The constellation graph 1000 may represent detection (optical and electrical) thresholds and a decoding table for a multilevel receiver that employs the demodulator 900. For example, the logic circuitry 928 may determine that: a $y_1$ value of (++) and a $y_2$ value of (-) correspond to a constellation point associated with a bit stream of 000; a $y_1$ value of (+) and a $y_2$ value of (--) correspond to a constellation point associated with a bit stream of 001; a $y_1$ value of (-) and aye value of (--) correspond to a constellation point associated with a bit stream of 011; a $y_1$ value of (--) and a $y_2$ value of (-) correspond to a constellation point associated with a bit stream of 010; a $y_1$ value of (--) and aye value of (+) correspond to a constellation point associated with a bit stream of 110; a $y_1$ value of (-) and a $y_2$ value of (++) correspond to a constellation point associated with a bit stream of 111; and a $y_1$ value of (+) and aye value of (++) correspond to a constellation point associated with a bit stream of 101.

In some embodiments, surplus sets may exist that are not matched to constellations of optical D8PSK signals. The number of all the possible decision sets is 16 ($2^4$ for a bi-level receiver and $4^2$ for a multilevel receiver). Even though the redundant sets may also represent symbol errors, they can be corrected to the nearest symbols in a maximum-likelihood manner. This may be used to enhance bit-error-rate (BER) performance.

Figure 11:
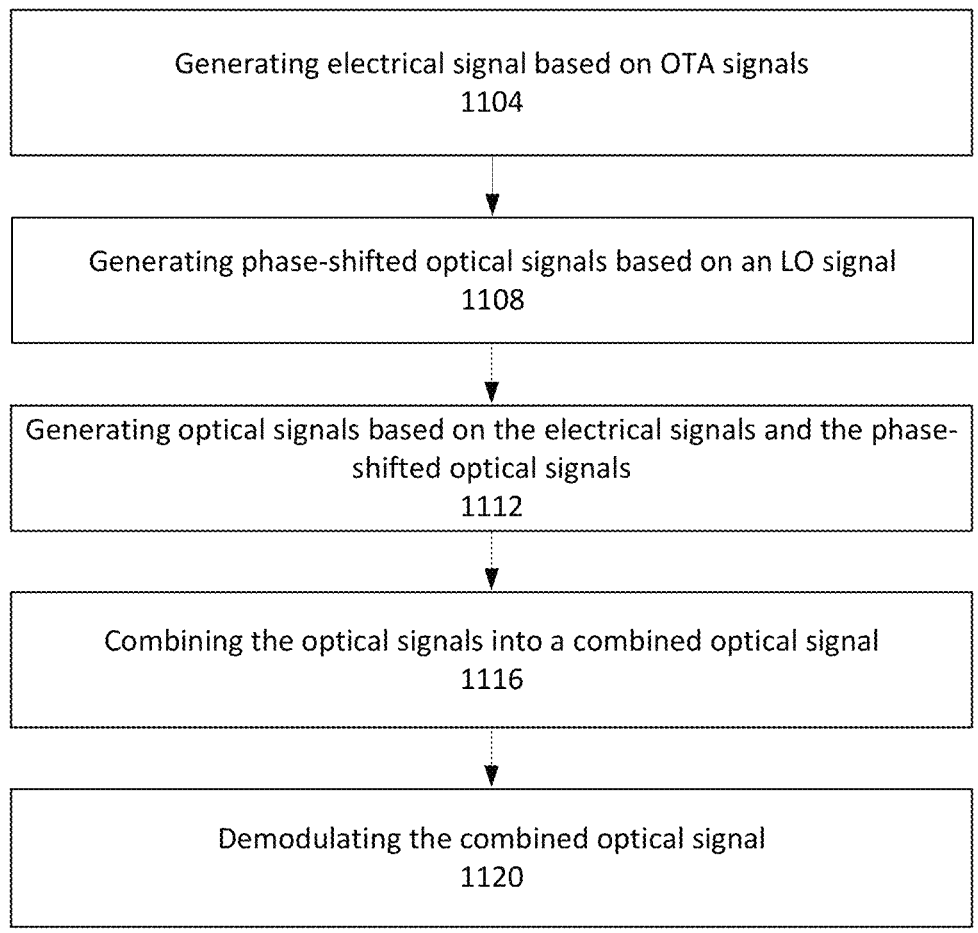
FIG. 11 illustrates an operational flow/algorithmic structure in accordance with some embodiments.

FIG. 11 illustrates an operational flow/algorithmic structure 1100 in accordance with some embodiments. The operation flow/algorithmic structure 1100 may be performed or implemented by a UE such as, for example, UE 120 or 1200; or components thereof such as receiver 1210.

The operation flow/algorithmic structure 1100 may include, at 1104, generating an electrical signal based on OTA signals. The OTA signals may be RF signals in the THz frequency range that are received by an array of antennas and converted into electrical signals.

The operation flow/algorithmic structure 1100 may further include, at 1108, generating phase-shifted optical signals based on an LO signal. The LO signal, which may be generated by a VCSEL, may be phase-shifted through a plurality of MZMs or DLIs. The controls provided to phase shift the optical signals may be based on beamforming weights determined through a beamforming process that is performed on a UE or remotely (for example, in an access point or central office).

The operation flow/algorithmic structure 1100 may further include, at 1112, generating optical signals based on the electrical signals and the phase-shifted optical signals. The optical signals may be generated by photodetectors that up-convert the electrical signals based on the phase-shifted optical signals.

The operation flow/algorithmic structure 1100 may further include, at 1116, combining the optical signals into a combined optical signal. This may be performed by an optical combiner.

The operation flow/algorithmic structure 1100 may further include, at 1120, demodulating the combined optical signal. The demodulating may be performed by one or more demodulation chains followed by a logic circuit. Each demodulation chain may include DLI and a balanced detector. The DLI may be used to generate intensity-modulated optical signals and the balanced detector may be used to generate bi-level or multi-level electrical signals based on the intensity-modulated optical signals. The logic circuit may generate a digital signal based on the bi-level or multi-level electrical signals using signal constellations based on DBPSK, DQPSK, 8DPSK, 16DPSK, or star 16QAM modulation schemes.

Figure 12:
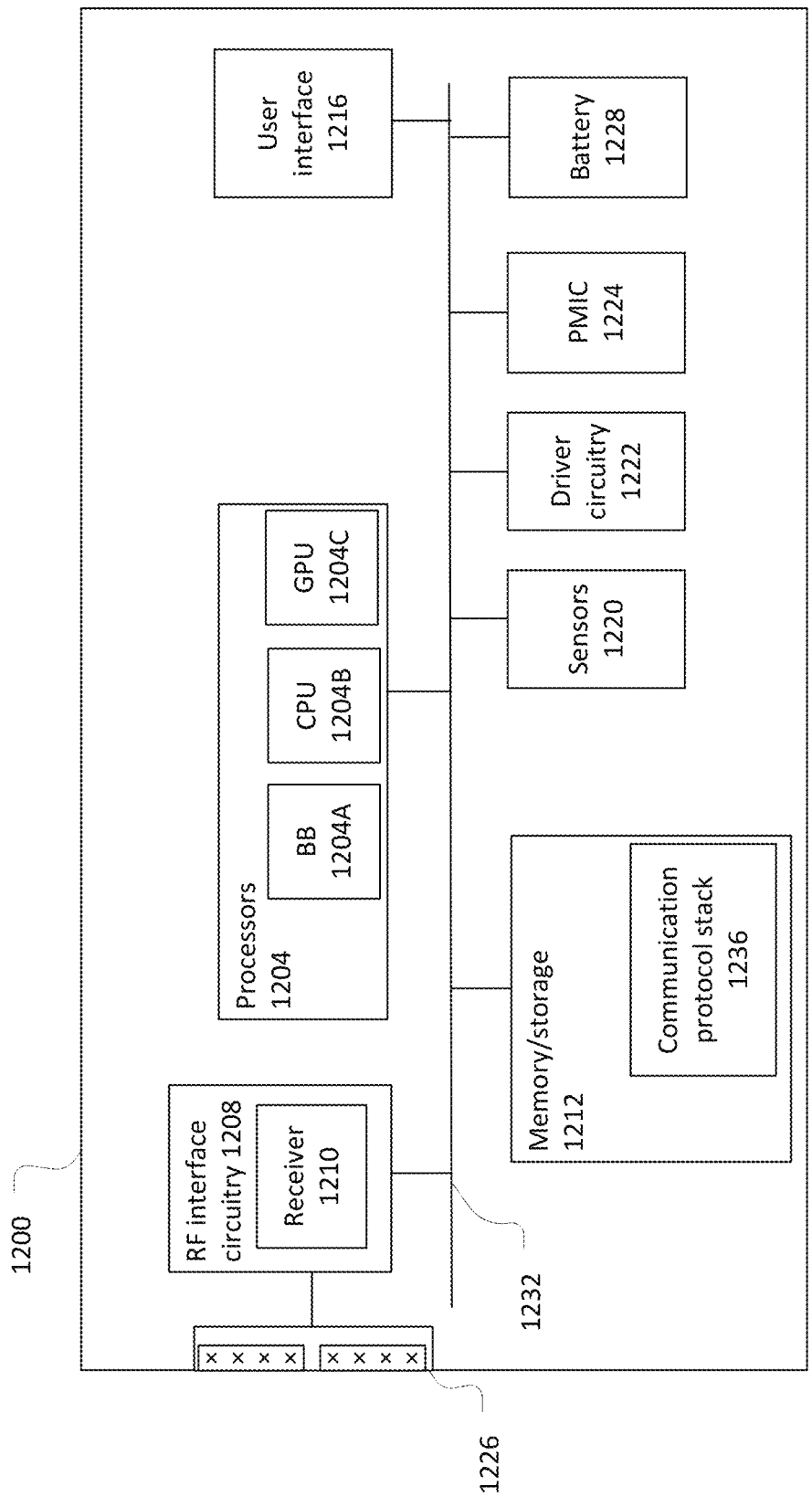
FIG. 12 illustrates a user equipment in accordance with some embodiments.

FIG. 12 illustrates a UE 1200 in accordance with some embodiments. The UE 1200 may be similar to and substantially interchangeable with UE 120.

The UE 1200 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, or actuators), video surveillance/monitoring devices (for example, cameras or video cameras), wearable devices (for example, a smart watch), or Internet-of-things devices.

The UE 1200 may include processors 1204, RF interface circuitry 1208, memory/storage 1212, user interface 1216, sensors 1220, driver circuitry 1222, power management integrated circuit (PMIC) 1224, antenna structure 1226, and battery 1228. The components of the UE 1200 may be implemented as integrated circuits (ICs), portions thereof, discrete electronic devices, or other modules, logic, hardware, software, firmware, or a combination thereof. The block diagram of FIG. 12 is intended to show a high-level view of some of the components of the UE 1200. However, some of the components shown may be omitted, additional components may be present, and different arrangement of the components shown may occur in other implementations.

The components of the UE 1200 may be coupled with various other components over one or more interconnects 1232, which may represent any type of interface, input/output, bus (local, system, or expansion), transmission line, trace, or optical connection that allows various circuit components (on common or different chips or chipsets) to interact with one another.

The processors 1204 may include processor circuitry such as, for example, baseband processor circuitry (BB) 1204A, central processor unit circuitry (CPU) 1204B, and graphics processor unit circuitry (GPU) 1204C. The processors 1204 may include any type of circuitry or processor circuitry that executes or otherwise operates computer-executable instructions, such as program code, software modules, or functional processes from memory/storage 1212 to cause the UE 1200 to perform operations as described herein.

In some embodiments, the baseband processor circuitry 1204A may access a communication protocol stack 1236 in the memory/storage 1212 to communicate over a 3GPP compatible network. In general, the baseband processor circuitry 1204A may access the communication protocol stack 1236 to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a NAS layer. In some embodiments, the PHY layer operations may additionally/alternatively be performed by the components of the RF interface circuitry 1208.

The baseband processor circuitry 1204A may generate or process baseband signals or waveforms that carry information in wireless networks such as 3GPP-compatible networks. In some embodiments, the waveforms may be based on DBPSK, DQPSK, 8DPSK, 16DPSK, or Star 16QAM.

The memory/storage 1212 may include one or more non-transitory, computer-readable media that include instructions (for example, communication protocol stack 1236) that may be executed by one or more of the processors 1204 to cause the UE 1200 to perform various operations described herein. The memory/storage 1212 include any type of volatile or non-volatile memory that may be distributed throughout the UE 1200. In some embodiments, some of the memory/storage 1212 may be located on the processors 1204 themselves (for example, L1 and L2 cache), while other memory/storage 1212 is external to the processors 1204 but accessible thereto via a memory interface. The memory/storage 1212 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The RF interface circuitry 1208 may include transceiver circuitry and radio frequency front module (RFEM) that allows the UE 1200 to communicate with other devices over a radio access network. The RF interface circuitry 1208 may include various elements arranged in transmit or receive paths. These elements may include, for example, switches, mixers, amplifiers, filters, synthesizer circuitry, and control circuitry.

In the receive path, the RFEM may have receiver 1210, which may be similar to and substantially interchangeable with, receiver 200.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1226.

In various embodiments, the RF interface circuitry 1208 may be configured to transmit/receive signals in a manner compatible with NR access technologies.

The antenna 1226 may include antenna elements to convert electrical signals into radio waves to travel through the air and to convert received radio waves into electrical signals. The antenna elements may be arranged into one or more antenna panels. The antenna 1226 may have antenna panels that are omnidirectional, directional, or a combination thereof to enable beamforming and multiple input, multiple-output communications. The antenna 1226 may include microstrip antennas, printed antennas fabricated on the surface of one or more printed circuit boards, patch antennas, or phased array antennas. The antenna 1226 may have one or more panels designed for specific frequency bands including bands in FR1 or FR2.

The user interface circuitry 1216 includes various input/output (I/O) devices designed to enable user interaction with the UE 1200. The user interface 1216 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes (LEDs) and multi-character visual outputs, or more complex outputs such as display devices or touchscreens (for example, liquid crystal displays (LCDs), LED displays, quantum dot displays, and projectors), with the output of characters, graphics, multimedia objects, and the like being generated or produced from the operation of the UE 1200.

The sensors 1220 may include devices, modules, or subsystems whose purpose is to detect events or changes in their environment and send the information (sensor data) about the detected events to some other device, module, or subsystem. Examples of such sensors include inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; and microphones or other like audio capture devices.

The driver circuitry 1222 may include software and hardware elements that operate to control particular devices that are embedded in the UE 1200, attached to the UE 1200, or otherwise communicatively coupled with the UE 1200. The driver circuitry 1222 may include individual drivers allowing other components to interact with or control various input/output (I/O) devices that may be present within, or connected to, the UE 1200. For example, driver circuitry 1222 may include a display driver to control and allow access to a display device, a touchscreen driver to control and allow access to a touchscreen interface, sensor drivers to obtain sensor readings of sensor circuitry 1220 and control and allow access to sensor circuitry 1220, drivers to obtain actuator positions of electro-mechanic components or control and allow access to the electro-mechanic components, a camera driver to control and allow access to an embedded image capture device, audio drivers to control and allow access to one or more audio devices.

The PMIC 1224 may manage power provided to various components of the UE 1200. In particular, with respect to the processors 1204, the PMIC 1224 may control power-source selection, voltage scaling, battery charging, or DC-to-DC conversion.

A battery 1228 may power the UE 1200, although in some examples the UE 1200 may be deployed in a fixed location, and may have a power supply coupled to an electrical grid. The battery 1228 may be a lithium ion battery; a metal-air battery, such as a zinc-air battery; an aluminum-air battery; a lithium-air battery; and the like. In some implementations, such as in vehicle-based applications, the battery 1228 may be a typical lead-acid automotive battery.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, or network element as described above in connection with one or more of the preceding figures may be configured to operate in accordance with one or more of the examples set forth below in the example section.

EXAMPLES

In the following sections, further exemplary embodiments are provided.

Example 1 includes an apparatus comprising: an antenna to provide an electrical signal based on a received over-the-air (OTA) signal; a photodiode coupled with the antenna to provide an optical signal based on the electrical signal; and a demodulator coupled with the photodiode to generate a digital signal based on the optical signal.

Example 2 includes the apparatus of example 1 or some other example herein, wherein the demodulator is to perform differential demodulation.

Example 3 includes the apparatus of example 2 or some other example herein, wherein the demodulator comprises: a delay line interferometer to: receive a portion of the optical signal; generate a differential phase modulated optical signal based on the portion; and generate a pair of intensity-modulated optical signals based on the differential phase modulated optical signals; and a balanced detector coupled with the delay line interferometer, the balanced detector having: a pair of photodiodes to generate a respective pair of electrical signals based on the pair of intensity-modulated optical signals; and a threshold detector to generate a bi-level or multi-level signal based on a difference between the pair of electrical signals.

Example 4 includes the apparatus of example 2 or some other example herein, wherein the demodulator further comprises: a plurality of branches with individual branches including a delay line interferometer and a balanced detector to output a bi-level or multi-level signal; and logic circuitry coupled with the plurality of branches to generate one or more bits of information based on the bi-level or multi-level signals output from the plurality of branches.

Example 5 includes the apparatus of example 4 or some other example herein, wherein the logic circuitry is to generate the one or more bits of information based on differential binary phase shift keying (DBPSK), differential quadrature phase shift keying (DQPSK), eight DPSK (8DPSK), sixteen DPSK (16DPSK), or star sixteen quadrature amplitude modulation (16QAM).

Example 6 includes an apparatus comprising: an array of antennas to provide electrical signals based on received over-the-air (OTA) signals; an array of Mach-Zehnder modulators (MZMs) to provide phase-shifted optical signals; an array of photodiodes respectively coupled with the array of antennas and the array of MZMs to provide optical signals based on the electrical signals and the phase-shifted optical signals; and an optical combiner coupled with the array of photodiodes to generate a combined optical signal based on the optical signals from the array of photodiodes.

Example 7 includes the apparatus of example 6 or some other example herein, further comprising: a demodulator coupled with the optical combiner to generate a digital signal based on the combined optical signal.

Example 8 includes the apparatus for example 7 or some other example herein, wherein the demodulator is to perform differential demodulation.

Example 9 includes the apparatus of example 8 or some other example herein, wherein the demodulator comprises: a delay line interferometer to: receive a portion of the optical signal; generate a differential phase modulated optical signal based on the portion; and generate a pair of intensity-modulated optical signals based on the differential phase modulated optical signals; and a balanced detector coupled with the delay line interferometer, the balanced detector having: a pair of photodiodes to generate a respective pair of electrical signals based on the pair of intensity-modulated optical signals; and a threshold detector to generate a bi-level or multi-level signal based on a difference between the pair of electrical signals.

Example 10 includes the apparatus of example 8 or some other example herein, wherein the demodulator further comprises: a plurality of branches with individual branches including a delay line interferometer and a balanced detector to output a bi-level or multi-level signal; and logic circuitry coupled with the plurality of branches to generate one or more bits of information based on the bi-level or multi-level signals output from the plurality of branches.

Example 11 includes the apparatus of example 10 or some other example herein, wherein the logic circuitry is to generate the one or more bits of information based on differential binary phase shift keying (DBPSK), differential quadrature phase shift keying (DQPSK), eight DPSK (8DPSK), sixteen DPSK (16DPSK), or star sixteen quadrature amplitude modulation (16QAM).

Example 12 includes the apparatus of example 6 or some other example herein, wherein the OTA signals include frequencies above 100 GHz.

Example 13 includes the apparatus of example 6 or some other example herein, wherein the array of MZMs comprise: a first MZM to receive a local oscillator (LO) signal and to shift the LO signal by a first phase shift; and a second MZM to receive the LO signal and to shift the LO signal by a second phase shift, wherein the first and second phase shifts are based on beamforming weights used to transmit the OTA signals.

Example 14 includes the apparatus of example 13 or some other example herein, further comprising: a vertical cavity surface emitting laser to generate the LO signal.

Example 15 includes the apparatus of example 6 or some other example herein, further comprising: an antenna array having the first antenna and the second antenna; and a dielectric lens coupled with the antenna array to amplify the first and second OTA signals.

Example 16 includes a method comprising: generating electrical signals based on over-the-air (OTA) signals; generating phase-shifted optical signals based on a local oscillator signal; generating optical signals based on the electrical signals and the phase-shifted optical signals; and combining the optical signals into a combined optical signal.

Example 17 includes the method of example 16 or some other example herein, further comprising: demodulating the combined optical signal to generate a digital signal.

Example 18 includes the method of example 17 or some other example herein, wherein demodulating the combined optical signal comprises: performing differential demodulation on the combined optical signal.

Example 19 includes the method of example 17 or some other example herein, wherein demodulating the combined optical signal comprises: generating, with a delay-line interferometer, a pair of intensity-modulated optical signals.

Example 20 includes the method of example 19 or some other example herein, wherein demodulating the combined optical signal further comprises: generating a bi-level or multi-level electrical signal based on the pair of intensity-modulated optical signals.

Example 21 includes the method of example 20 or some other example herein, wherein demodulating the combined optical signal further comprises: generating one or more bits of information based on the bi-level or multi-level electrical signal.

Example 22 includes the method of example 17 or some other example herein, wherein demodulating the combined optical signal further comprises: generating a plurality of bi-level or multi-level electrical signals through a corresponding plurality of delay-line interferometers and balanced detectors; and generating the digital signal based on the plurality of bi-level or multi-level electrical signals.

Example 23 includes the method of example 17 or some other example herein, wherein demodulating the combined optical signal is based on differential binary phase shift keying (DBPSK), differential quadrature phase shift keying (DQPSK), eight DPSK (8DPSK), sixteen DPSK (16DPSK), or star sixteen quadrature amplitude modulation (16QAM).

Example 24 includes the method of example 19 or some other example herein, wherein generating the optical signals comprises: upconverting the phase-shifted optical signals based on the electrical signals using a photodetection process.

Example 25 includes the method of example 16 or some other example herein, wherein the over-the-air signals are in a terahertz frequency range.

Example 26 may include an apparatus comprising means to perform one or more elements of a method described in or related to any of examples 1-25, or any other method or process described herein.

Example 27 may include one or more non-transitory computer-readable media comprising instructions to cause an electronic device, upon execution of the instructions by one or more processors of the electronic device, to perform one or more elements of a method described in or related to any of examples 1-25, or any other method or process described herein.

Example 28 may include an apparatus comprising logic, modules, or circuitry to perform one or more elements of a method described in or related to any of examples 1-25, or any other method or process described herein.

Example 29 may include a method, technique, or process as described in or related to any of examples 1-25, or portions or parts thereof.

Example 30 may include an apparatus comprising: one or more processors and one or more computer-readable media comprising instructions that, when executed by the one or more processors, cause the one or more processors to perform the method, techniques, or process as described in or related to any of examples 1-25, or portions thereof.

Example 31 may include a signal as described in or related to any of examples 1-25, or portions or parts thereof.

Example 32 may include a datagram, information element, packet, frame, segment, PDU, or message as described in or related to any of examples 1-25, or portions or parts thereof, or otherwise described in the present disclosure.

Example 33 may include a signal encoded with data as described in or related to any of examples 1-25, or portions or parts thereof, or otherwise described in the present disclosure.

Example 34 may include a signal encoded with a datagram, IE, packet, frame, segment, PDU, or message as described in or related to any of examples 1-25, or portions or parts thereof, or otherwise described in the present disclosure.

Example 35 may include an electromagnetic signal carrying computer-readable instructions, wherein execution of the computer-readable instructions by one or more processors is to cause the one or more processors to perform the method, techniques, or process as described in or related to any of examples 1-25, or portions thereof.

Example 36 may include a computer program comprising instructions, wherein execution of the program by a processing element is to cause the processing element to carry out the method, techniques, or process as described in or related to any of examples 1-25, or portions thereof.

Example 37 may include a signal in a wireless network as shown and described herein.

Example 38 may include a method of communicating in a wireless network as shown and described herein.

Example 39 may include a system for providing wireless communication as shown and described herein.

Example 40 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus comprising:
   an antenna to provide an electrical signal based on a received over-the-air (OTA) signal;
   a diode coupled with the antenna to provide an optical signal based on the electrical signal; and
   a demodulator coupled with the diode to generate a digital signal based on the optical signal, wherein the demodulator is to perform differential demodulation.

2. The apparatus of claim 1, wherein the demodulator comprises:
   a delay line interferometer to:
      receive a portion of the optical signal;
      generate a differential phase modulated optical signal based on the portion; and
      generate a pair of intensity-modulated optical signals based on the differential phase modulated optical signals; and
   a balanced detector coupled with the delay line interferometer, the balanced detector having: a pair of diodes to generate a respective pair of electrical signals based on the pair of intensity-modulated optical signals; and a threshold detector to generate a bi-level or multi-level signal based on a difference between the pair of electrical signals.

3. The apparatus of claim 1, wherein the demodulator comprises:
a plurality of branches with individual branches including a delay line interferometer and a balanced detector to output a bi-level or multi-level signal; and
logic circuitry coupled with the plurality of branches to generate one or more bits of information based on the bi-level or multi-level signals output from the plurality of branches.

4. The apparatus of claim 3, wherein the logic circuitry is to generate the one or more bits of information based on differential binary phase shift keying (DBPSK), differential quadrature phase shift keying (DQPSK), eight DPSK (8DPSK), sixteen DPSK (16DPSK), or star sixteen quadrature amplitude modulation (16QAM).

5. An apparatus comprising:
an array of antennas to provide electrical signals based on received over-the-air (OTA) signals;
an array of Mach-Zehnder modulators (MZMs) to provide phase-shifted optical signals;
an array of diodes respectively coupled with the array of antennas and the array of MZMs to provide optical signals based on the electrical signals and the phase-shifted optical signals; and
an optical combiner coupled with the array of diodes to generate a combined optical signal based on the optical signals from the array of diodes.

6. The apparatus of claim 5, further comprising:
a demodulator coupled with the optical combiner to generate a digital signal based on the combined optical signal.

7. The apparatus of claim 6, wherein the demodulator comprises:
a delay line interferometer to:
receive a portion of the combined optical signal;
generate a differential phase modulated optical signal based on the portion; and
generate a pair of intensity-modulated optical signals based on the differential phase modulated optical signals; and
a balanced detector coupled with the delay line interferometer, the balanced detector having:
a pair of diodes to generate a respective pair of electrical signals based on the pair of intensity-modulated optical signals; and
a threshold detector to generate a bi-level or multi-level signal based on a difference between the pair of electrical signals.

8. The apparatus of claim 6, wherein the demodulator comprises:
a plurality of branches with individual branches including a delay line interferometer and a balanced detector to output a bi-level or multi-level signal; and
logic circuitry coupled with the plurality of branches to generate one or more bits of information based on the bi-level or multi-level signals output from the plurality of branches.

9. The apparatus of claim 8, wherein the logic circuitry is to generate the one or more bits of information based on differential binary phase shift keying (DBPSK), differential quadrature phase shift keying (DQPSK), eight DPSK (8DPSK), sixteen DPSK (16DPSK), or star sixteen quadrature amplitude modulation (16QAM).

10. The apparatus of claim 5, wherein the OTA signals include frequencies above 100 GHz.

11. The apparatus of claim 5, wherein the array of MZMs comprise:
a first MZM to receive a local oscillator (LO) signal and to shift the LO signal by a first phase shift; and
a second MZM to receive the LO signal and to shift the LO signal by a second phase shift, wherein the first and second phase shifts are based on beamforming weights used to transmit the OTA signals.

12. The apparatus of claim 11, further comprising:
a vertical cavity surface emitting laser to generate the LO signal.

13. The apparatus of claim 5, further comprising:
an antenna array having a first antenna to receive a first OTA signal and a second antenna to receive a second OTA signal; and
a dielectric lens coupled with the antenna array to amplify the first and second OTA signals.

14. A method comprising:
generating electrical signals based on over-the-air (OTA) signals;
generating phase-shifted optical signals based on a local oscillator signal;
generating optical signals based on the electrical signals and the phase-shifted optical signals; and
combining the optical signals into a combined optical signal.

15. The method of claim 14, further comprising:
demodulating the combined optical signal to generate a digital signal.

16. The method of claim 15, wherein demodulating the combined optical signal comprises:
generating, with a delay-line interferometer, a pair of intensity-modulated optical signals.

17. The method of claim 16, wherein demodulating the combined optical signal further comprises:
generating a bi-level or multi-level electrical signal based on the pair of intensity-modulated optical signals.

18. The method of claim 17, wherein demodulating the combined optical signal further comprises: generating one or more bits of information based on the bi-level or multi-level electrical signal.

19. The method of claim 15, wherein demodulating the combined optical signal is based on differential binary phase shift keying (DBPSK), differential quadrature phase shift keying (DQPSK), eight DPSK (8DPSK), sixteen DPSK (16DPSK), or star sixteen quadrature amplitude modulation (16QAM) and further comprises:
generating a plurality of bi-level or multi-level electrical signals through a corresponding plurality of delay-line interferometers and balanced detectors; and
generating the digital signal based on the plurality of bi-level or multi-level electrical signals.

20. The method of claim 14, wherein the OTA signals are in a terahertz frequency range and generating the optical signals comprises:
upconverting the phase-shifted optical signals based on the electrical signals using a photodetection process.

* * * * *